United States Patent

Paulino

(10) Patent No.: US 7,905,031 B1
(45) Date of Patent: Mar. 15, 2011

(54) PROCESS FOR MEASURING A PART

(75) Inventor: Joseph R Paulino, West Palm Beach, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 12/717,337

(22) Filed: Mar. 4, 2010

Related U.S. Application Data

(60) Provisional application No. 61/158,090, filed on Mar. 6, 2009.

(51) Int. Cl.
*G06F 19/00* (2006.01)
*G01B 21/00* (2006.01)

(52) U.S. Cl. .................. 33/553; 33/503; 702/95

(58) Field of Classification Search ............ 33/553, 33/503; 702/95
See application file for complete search history.

(56) References Cited

U.S. PATENT DOCUMENTS

| | | | | |
|---|---|---|---|---|
| 4,991,304 A | * | 2/1991 | McMurtry | 33/505 |
| 5,251,156 A | * | 10/1993 | Heier et al. | 702/167 |
| 6,470,587 B1 | * | 10/2002 | Cunningham et al. | 33/557 |
| 7,079,969 B2 | * | 7/2006 | Taylor et al. | 702/95 |
| 7,131,207 B2 | * | 11/2006 | McFarland | 33/503 |
| 7,336,375 B1 | * | 2/2008 | Faul et al. | 356/604 |
| 7,358,516 B2 | * | 4/2008 | Holler et al. | 250/559.33 |
| 7,712,224 B2 | * | 5/2010 | Hicks | 33/502 |
| 2002/0179866 A1 | * | 12/2002 | Hoeller et al. | 250/559.33 |
| 2008/0271332 A1 | * | 11/2008 | Jordil et al. | 33/503 |
| 2010/0149534 A1 | * | 6/2010 | White et al. | 356/398 |
| 2010/0207619 A1 | * | 8/2010 | Wu et al. | 324/238 |

* cited by examiner

*Primary Examiner* — Christopher W Fulton
(74) *Attorney, Agent, or Firm* — John Ryznic

(57) ABSTRACT

A process in which a white light scanner and a CMM are integrated into one inspection tool. The white light scanner and CMM will be tied to the same table and articulate using the same mechanism. Both inspection processes use the same absolute point to take measurements. The white light data will be modified using the CMM inspection data. Ultimately, the output of the inspection process will be a surface created by the white light inspection with the accuracy of a CMM. The white light scanner first scans the part to determine the surface topography within a first predetermined tolerance. The CMM scanner then scans the part using the coordinates from the white light scanner to position the probe close and fast, and then scans the surface topography of the part with a better tolerance than the white light scanner.

4 Claims, 1 Drawing Sheet

PROCESS FOR MEASURING A PART

CROSS-REFERENCE TO RELATED APPLICATIONS

This application claims the benefit to a U.S. Provisional Patent Application 61/158,090 filed on Mar. 6, 2009 and entitled APPARATUS AND PROCESS FOR MEASURING A PART.

FEDERAL RESEARCH STATEMENT

None.

BACKGROUND OF THE INVENTION

1. Field of the Invention

The present invention relates generally to an accurate measurement of a part, and more specifically to a coordinate measurement machine with improved speed of operation.

2. Description of the Related Art Including Information Disclosed Under 37 CFR 1.97 and 1.98

A CMM (coordinate measurement machine or center measurement machine) is an apparatus used to inspect features that require tight control in the order of 0.0001 inch. To use a CMM, a programmer must create an inspection program for the CNN to accurately and correctly probe the part relative to an absolute point. The output of the CMM is X,Y,Z coordinates. These coordinates can be post-processed to create lines, planes and surfaces. The CMM apparatus includes a probe that is used to determine a coordinate by touching the probe tip to the part that is to be measured.

The coordinate measuring machine (CMM) is a device for measuring the physical geometrical characteristics of an object. This machine may be manually controlled by an operator or it may be computer controlled. Measurements are defined by a probe attached to the third moving axis of this machine. Probes may be mechanical, optical, laser, or white light, among others. The typical CMM is composed of three axes, an X, Y and Z axis. These axes are orthogonal to each other in a typical three dimensional coordinate system. Each axis has a scale system that indicates the location of that axis. The machine will read the input from the probe as directed by the operator or programmer. The machine then uses the X,Y,Z coordinates of each of these points to determine size and position.

A coordinate measuring machine (CMM) is also a device used in manufacturing and assembly processes to test a part or assembly against the design intent. By precisely recording the X, Y, and Z coordinates of the target, points are generated which can then be analyzed via regression algorithms for the construction of features. These points are collected by using a probe that is positioned manually by an operator or automatically via Direct Computer Control (DCC).

The CMM program must be tested to ensure the CMM probe does not run into the part or apply too much pressure because the part is not where the CMM program expects it to be. This process is very slow and does not work well with parts that have a large variation from one to another. Thus, the movement of the probe must be kept at a very low speed so as not to damage the probe. Therefore, the process of accurately measuring the part will take a long time.

In the early days of coordinate measurement, mechanical probes were fitted into a special holder on the end of the quill. A very common probe was made by soldering a hard ball to the end of a shaft. This was ideal for measuring a whole range of flat, cylindrical or spherical surfaces. Other probes were ground to specific shapes, for example a quadrant, to enable measurement of special features. These probes were physically held against the work piece with the position in space being read from a 3-Axis digital readout (DRO) or, in more advanced systems, being logged into a computer by means of a footswitch or similar device. Measurements taken by this contact method were often unreliable as machines were moved by hand and each machine operator applied different amounts of pressure on the probe or adopted differing techniques for the measurement.

A further development was the addition of motors for driving each axis. Operators no longer had to physically touch the machine but could drive each axis using a hand box with joysticks in much the same way as with modern remote controlled cars. Measurement accuracy and precision improved dramatically with the invention of the electronic touch trigger probe. Although still a contact device, the probe had a spring loaded steel ball (later ruby ball) stylus. As the probe touched the surface of the component, the stylus deflected and simultaneously sent the X,Y,Z coordinate information to the computer. Measurement errors caused by individual operators became fewer and the stage was set for the introduction of CNC operations and the coming of age of CMMs.

Optical probes are lens-CCD-systems, which are moved like the mechanical ones, and are aimed at the point of interest, instead of touching the material. The captured image of the surface will be enclosed in the borders of a measuring window, until the residue is adequate to contrast between black and white zones. The dividing curve can be calculated to a point, which is the wanted measuring point in space. The horizontal information on the CCD is 2D (XY) and the vertical position is the position of the complete probing system on the stand Z-drive (or other device component). This allows entire 3D-probing.

There are newer models that have probes that drag along the surface of the part taking points at specified intervals. This method of CMM inspection is more accurate than the conventional touch-probe method and most times faster as well. The next generation of scanning, known as laser scanning, is advancing very quickly. This method uses laser beams that are projected against the surface of the part. Many thousands of points can then be taken and used to not only check size and position, but to create a 3D image of the part as well. This "point-cloud data" can then be transferred to CAD software to create a working 3D model of the part. The laser scanner is often used to facilitate the "reverse engineering" process. This is the process of taking an existing part, measuring it to determine its size, and creating engineering drawings from these measurements. This is most often necessary in cases where engineering drawings may no longer exist or are unavailable for the particular part that needs replacement.

Optical probes and/or laser probes can be used (if possible in combination), which change CMMs to measuring microscopes or multi sensor measuring machines. Fringe projection systems, theodolite triangulation systems or laser distant and triangulation systems are not called measuring machines, but the measuring result is the same: a space point. Laser probes are used to detect the distance between the surface and the reference point on the end of the kinematic chain (i.e.: end of the Z-drive component). This can use an interferometrical, a light deflection or half beam shadowing principle.

White light inspection is a relatively new inspection process that uses optics to scan a surface. This process is quick and produces surfaces that can be compared to a solid model. A real part, such as a turbine rotor blade, can be scanned using a white light scanner to produce a computer generated 3D solid model of the part with details that include small cracks on the surface. The resulting computer generated solid model of the part can then be used in a FEA (finite element analysis) program for further modeling and testing. Unfortunately, the speed and convenience of white light scanning comes at the cost of accuracy. White light scanning has an order to magnitude more error (in the order of 0.001 inch) than a CMM.

White light scanning is the art, science, and technology of obtaining reliable information about physical objects through the process of recording, measuring, and interpreting photographic images. White light scanning uses the image of a 3D scene on a 2D medium to reconstruct a reliable and accurate model of the original 3D scene. As a non-contact measuring device, the ATOS III system retrieves all off its data through photographs. The system is comprised off a projector and two cameras which are mounted to a frame. By projecting a fringe pattern onto an object and simultaneously recording the pattern, the software is able to create an accurate point cloud of up to 4 million points of the surface of the object. For larger projects, reference points are added which allow a quick and accurate way to join together multiple measurements. The ATOS IIII system is able to take on projects from the size off a dime up to the size off an airplane. After the measurements are taken, the software processes the data creating a single point cloud file with a common point of origin. The data can then be aligned and manipulated to suit the needs of the required task.

BRIEF SUMMARY OF THE INVENTION

The present invention is an apparatus and a process in which a white light scanner and a CMM are integrated into one inspection tool. The white light scanner and CMM will be tied to the same table and articulate using the same mechanism. Both inspection processes use the same absolute point to take measurements. The white light data will be modified using the CMM inspection data. Ultimately, the output of the inspection process will be a surface created by the white light inspection with the accuracy of a CMM. The white light scanner first scans the part to determine the surface topography within a first predetermined tolerance. The CMM scanner then scans the part using the coordinates from the white light scanner to position the probe close and fast, and then scans the surface topography of the part with a better tolerance than the white light scanner.

DETAILED DESCRIPTION OF THE INVENTION

Figure 1:
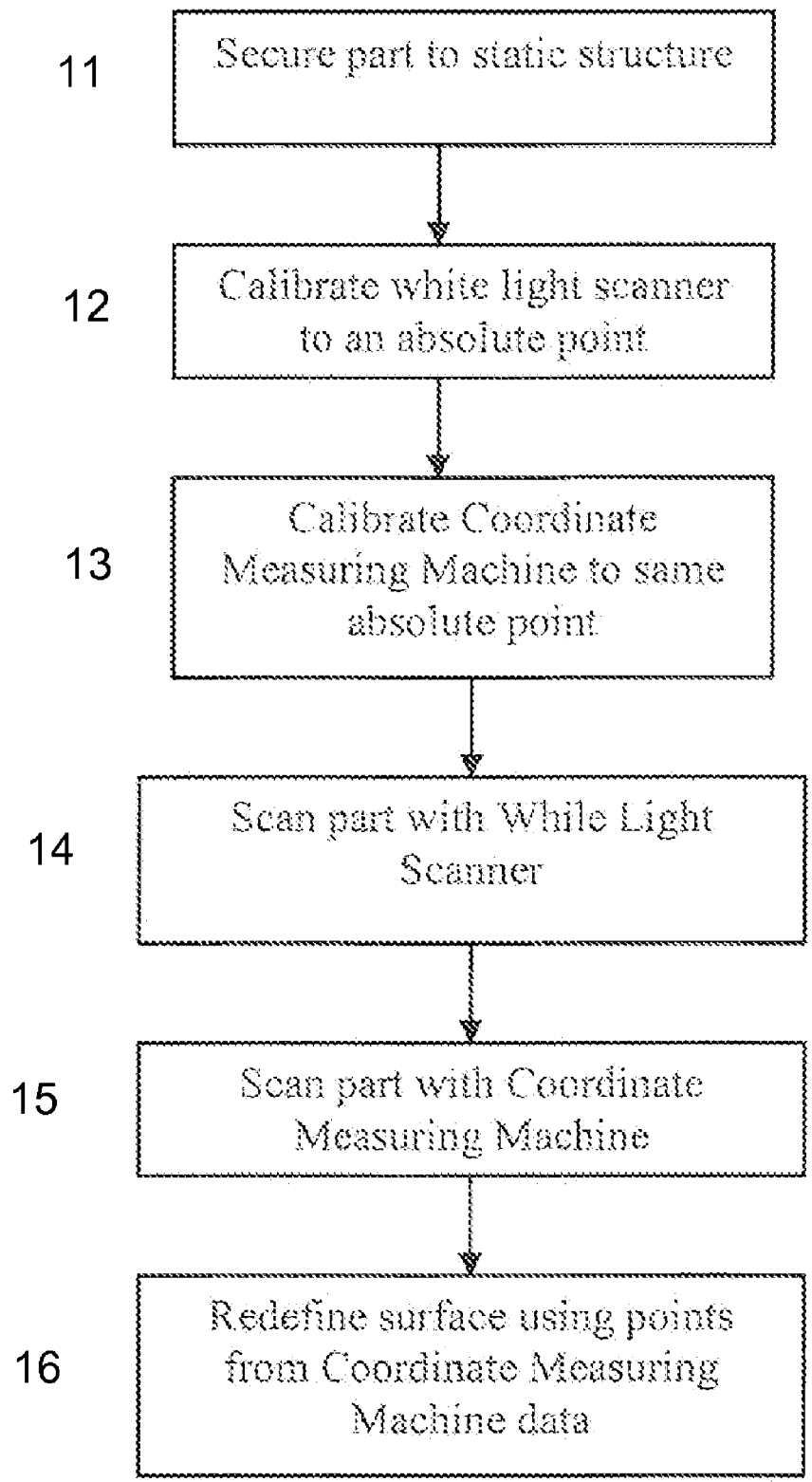
FIG. 1 shows a process of measuring a part using the white light scanner and the CMM of the present invention.

The apparatus and process for measuring a part is a combination of a CMM and a white light scanner that will use the white light scanner to scan the part in order to determine a rough location of where the surface on the part is, and then use the CMM to move quickly to the rough location, minus a specified distance from the rough location, and then use the probe to find the exact location. The white light scanning of the part makes for the overall CMM process much quicker, especially when a number of parts to be measured have large variations from one another.

A part to be scanned is first secured to a static structure (step 11) so that the scanner and the measuring device can rotate about the static part for the scanning and measuring process. The process will be to calibrate the white light scanner and the CMM to the same absolute inspection point. First, the white light scanner will be calibrated to an absolute point (step 12). Then, the CMM will be calibrated (step 13) to the same absolute point. The part is then scanned by the white light scanner to produce data on the surface of the part (step 14). Then, the CMM will measure several points to get X,Y,Z coordinates for the points (step 15). At this point, the CMM "knows" within the tolerance of the white light scan data where the part is physically relative to the absolute point. This would save the time required to determine if the CMM probe will run into the part or apply too much pressure. The white light data will then have a profile of the part surface to around 0.001 inches in tolerance. With the data points from the CMM with accuracy of 0.0001 inches, the surface data is redefined (step 16) so that the points on the surface will know be at the exact location of the points from the CMM data. Thus, the scanned surface will be redefined by the CMM points to increase the accuracy of the scanned part to within 0.0001 inches tolerance. The redefined 3D model of the part is then exported for other use.

After the above steps, the process will begin the CMM inspection. Using CMM inspection, the process will update the white light data to create a more accurate surface profile or topography. Then, the process will post process the combined white light and CMM inspection report. The process requires high computing power by today's standards, but will eliminate the time it normally takes to test the CMM program and provide white light surfaces with CMM accuracy that can be compared to a CAD model.

I claim the following:

1. A process of scanning a part to produce an accurate topography of the part, comprising the steps of:
   secure a part to a static structure;
   calibrate a white light scanner to an absolute point;
   calibrate a coordinate measuring machine the same absolute point;
   scan the part with the white light scanner;
   scan the part with the coordinate measuring machine; and,
   refine the part surface using the points from the coordinate measuring machine scan.

2. The process of scanning a part of claim 1, and further comprising the steps of:
   scanning the part with the white light scanner to obtain a topography of a first tolerance; and,
   scanning the part with the coordinate measuring machine to obtain a topography of a second tolerance which is less than the first tolerance.

3. The process of scanning a part of claim 2, and further comprising the step of:
   the first tolerance is around 0.001 inches and the second tolerance is around 0.00001 inches.

4. The process of scanning a part of claim 1, and further comprising the steps of:
   the part is an airfoil for use in a gas turbine engine.

* * * * *